(12) United States Patent
Martin

(10) Patent No.: US 6,350,028 B1
(45) Date of Patent: *Feb. 26, 2002

(54) INK JET PRINTING METHOD USING A PIGMENTED INK COMPOSITION

(75) Inventor: Thomas W. Martin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/473,248

(22) Filed: Dec. 27, 1999

(51) Int. Cl.$^7$ .............................. B41J 2/01; C09D 11/02
(52) U.S. Cl. .................. 347/100; 347/95; 106/31.86; 106/31.87; 106/31.89
(58) Field of Search ................ 347/100, 95, 84; 106/31.86, 31.87, 31.89

(56) References Cited

U.S. PATENT DOCUMENTS

| 5,223,026 | A | * | 6/1993 | Schwarz, Jr. ............. 106/31.43 |
|---|---|---|---|---|
| 5,453,121 | A | * | 9/1995 | Nicholls et al. ............. 524/104 |
| 5,713,993 | A | * | 2/1998 | Grezzo Page et al. ... 106/31.85 |
| 5,833,744 | A | | 11/1998 | Breton et al. ............. 106/31.59 |
| 6,077,338 | A | * | 6/2000 | Wallstrom ................. 106/31.6 |
| 6,137,514 | A | * | 10/2000 | Kovacs et al. ............. 347/100 |
| 6,248,163 | B1 | * | 6/2001 | Martin ..................... 106/31.86 |

* cited by examiner

*Primary Examiner*—N. Le
*Assistant Examiner*—Matthew T. Welker
(74) *Attorney, Agent, or Firm*—Harold E. Cole

(57) ABSTRACT

An ink jet printing method having the steps of: A) providing an ink jet printer that is responsive to digital data signals; B) loading the printer with ink-receptive substrates; C) loading the printer with an ink jet ink composition having from about 30 to about 90% by weight of water, from about 0.5 to about 30% by weight of a pigment, from about 0.05 to about 2% by weight of an aromatic sulfonate or disulfonate which is sodium p-toluenesulfonate, disodium 2,5-dihydroxybenzene-disulfonate monohydrate, sodium p-hydroxybenzene-sulfonate or sodium p-aminobenzenedisulfonate, and from about 10 to about 50% by weight of a humectant of a polyhydric alcohol; and D) printing on an ink-receptive substrate using the ink jet ink in response to the digital data signals.

6 Claims, No Drawings

INK JET PRINTING METHOD USING A PIGMENTED INK COMPOSITION

CROSS REFERENCE TO RELATED APPLICATION

Reference is made to commonly-assigned, copending U.S. patent application Ser. No. 09/472,577, filed Dec. 27, 1999, entitled "Additive For Ink Jet Ink", by Martin;

U.S. patent application Ser. No. 09/472,483, filed Dec. 27, 1999, entitled "Ink Jet Printing Method", by Erdtmann et al.; and U.S. patent application Ser. No. 09/472,484, filed Dec. 27, 1999, entitled "Additive for Ink Jet Ink", by Erdtmann et al.

FIELD OF THE INVENTION

This invention relates to an ink jet printing method which employs an additive for a pigmented ink jet ink to improve the dry time.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time.

A requirement in wide format ink jet printers is the delivery of at least 500 ml of ink through a printhead before nozzles begin to fail to fire ink droplets. Reproducible quantities of ink delivered prior to print cartridge failure (ink reliability) and particle size stability, over time, have been problems encountered with ink jet inks containing pigments as colorants and anionic dispersants.

U.S. patent application Ser. No.09/351,614, filed Jul. 12, 1999, (Docket79666HEC) entitled "Color Pigmented Ink Jet Ink Set" discloses a typical ink jet pigmented ink. However, there is a problem with print cartridges containing those inks in that the print reliability over an extended period of time is not as good as one would desire.

U.S. Pat. No. 5,833,744 relates to an ink jet ink containing a surfactant which may be an aromatic sulfonate such as sodium dodecylbenzene sulfonate. However, there is a problem with using sodium dodecylbenzene sulfonate in that the print reliability over an extended period of time is not effective with all pigments, as will be shown hereinafter.

It is an object of this invention to provide an ink jet printing method which employs an additive for a pigmented ink jet ink which would improve the print reliability. It is another object of this invention to provide an ink jet printing method which employs an additive for a pigmented ink jet ink which would be useful with a variety of pigments.

SUMMARY OF THE INVENTION

These and other objects are achieved in accordance with this invention which relates to an ink jet printing method, comprising the steps of:

A) providing an ink jet printer that is responsive to digital data signals;

B) loading the printer with ink-receptive substrates;

C) loading the printer with an ink jet ink composition comprising from about 30 to about 90% by weight of water, from about 0.5 to about 30% by weight of a pigment, from about 0.05 to about 2% by weight of an aromatic sulfonate or disulfonate comprising sodium p-toluenesulfonate, disodium 2,5-dihydroxybenzenedisulfonate monohydrate, sodium p-hydroxybenzenesulfonate or sodium p-aminobenzenedisulfonate, and from about 10 to about 50% by weight of a humectant comprising a polyhydric alcohol; and D) printing on an ink-receptive substrate using the ink jet ink in response to the digital data signals.

Use of the aromatic sulfonates or disulfonates in the inks employed in the process of this invention greatly increases the amount of ink that may be delivered before print nozzles begin to fail.

DETAILED DESCRIPTION OF THE INVENTION

As noted above, the ink jet ink composition employed in the process of the invention contains the aromatic sulfonate or disulfonate at a concentration of from about 0.05 to about 2.0 weight percent. In a preferred embodiment, the concentration of is from about 0.075 to about 0.5 weight percent.

In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. In a preferred embodiment, the pigment set is cyan pigment, C.I. Pigment Blue 15:3; quinacridone magenta, C.I. Pigment Red 122; C.I. Pigment Yellow 155; and carbon black, C.I. Pigment Black 7.

A humectant is added to the composition employed in the process of the invention to help prevent the ink from drying out or crusting in the orifices of the ink jet printhead. Polyhydric alcohols useful in the composition employed in the process of the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. As noted above, the humectant is employed in a concentration of from about 10 to about 50% by weight. In a preferred embodiment, diethylene glycol or a mixture of glycerol and diethylene glycol is employed a concentration of between 10 and 20 wt. %.

A co-solvent can also be employed in the composition employed in the process of the invention. The selection of a co-solvent depends on the requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

Ink Preparation

A preferred method for making the inks employed in the process of the invention is disclosed in U.S. Pat. No. 5,679,138, the disclosure of which is hereby incorporated by reference. In general, it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. The mill grind can be diluted with either additional water or water-miscible solvents to make a mill grind of the desired concentration. By dilution, the ink is adjusted to the desired viscosity, color, hue, saturation density and print area coverage for the particular application.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the composition employed in the process of the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosity's are no greater than 20 centipoise, and preferably in the range of about 1.0 to about 10.0 centipoise, more preferably from about 1.0 to about 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10 wt. %) may also be added to the ink composition employed in the process of the invention to help the ink penetrate the receiving substrate, especially when the substrate is a highly sized paper. A preferred penetrant for the inks employed in the process of the present invention is n-propanol at a final concentration of 1–6 wt. %.

A biocide (0.01–1.0 wt. %) may also be added to prevent unwanted microbial growth which may occur in the ink over time. A preferred biocide for the inks employed in the process of the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

Example 1

Control Example 1 (C-1)

| Mill Grind | |
|---|---:|
| Polymeric beads, mean diameter of 50 μm (milling media) | 325.0 g |
| C.I. Pigment Yellow 155 From Clariant Corp. | 30 g |
| Oleoyl methyl taurine, (KOMT) potassium salt | 7.5 g |
| Deionized water | 208.0 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. An aliquot of the above dispersion to yield 2.9 g pigment was mixed with 16.0 g diethylene glycol and additional deionized water for a total of 1100.0 g.

Control Example 2 (C-2)

This composition was prepared the same as C-1 except that it contained 0. 3 g of an ethoxylated trimethylnonanol surfactant, Tergitol® TMN-10 (Union Carbide Corp.).

Control Example 3 (C-3)

This composition was prepared the same as C-2 in Example 1 except that it also contained 0.5 grams of sodium dodecylbenzene sulfonate (U.S. Pat. No. 5,833,744)

Invention Example 1 (I-1)

This composition was prepared the same as C-2 except that it also contained 0.125 grams of sodium p-toluene sulfonate.

Invention Example 2 (I-2)

This composition was prepared the same as C-2 except that it also contained 0.125 grams of disodium 2,5-dihydroxybenzene disulfonate monohydrate and the pigment was C.I. Pigment Blue 15:3 in an amount of 1.75 g.

Invention Example 3 (I-3)

This composition was prepared the same as C-2 except that it also contained 0.10 grams of sodium p-hydroxybenzene sulfonate, the pigment was C.I. Pigment Red 122 in an amount of 2.9 g, the diethylene glycol was 12.0 g and the Tergitol® TMN-10 amount was 0.6 g.

Invention Example 4 (I-4)

This composition was prepared the same as C-2 except that it also contained 0.10 grams of disodium 2,5-dihydroxybenzene disulfonate monohydrate, the pigment was C.I. Pigment Black 7 in an amount of 2.15 g, the diethylene glycol was 12.0 g and the Tergitol® TMN-10 amount was 0.3 g.

Invention Example 5 (I-5)

This composition was prepared the same as C-2 except that it also contained 0.125 grams of sodium p-aminobenzenedisulfonate.

Ink Reliability Testing

An apparatus that will fire a single nozzle of a 104 nozzle ink cartridge utilized to print each colored ink in the Kodak Professional 2042 Wide Format Inkjet Printers was designed and assembled. Crossover reliability testing between wide format printers and the single nozzle test apparatus (SNTA) indicated that delivery of 1.8 to 2.0 ml of ink in the SNTA, before the nozzle failed, was equivalent to delivery of 700 to 1000+ml of ink from a cartridge in a printer before one nozzle failed. Each of the example inks were evaluated in the SNTA utilizing three nozzles. Selected ink formulations were also evaluated for reliability in the Kodak 2042 Professional Wide Format Ink Jet Printer. The following results were obtained:

TABLE 1

| Element | Nozzle 1 (ml) | Nozzle 2 (ml) | Nozzle 3 (ml) | Printer (ml) |
| --- | --- | --- | --- | --- |
| C-1 | 0.91 | 0.86 | 1.03 | — |
| C-2 | 1.65 | 1.15 | 1.09 | 100 |
| C-3 | 1.74 | 1.05 | 1.3 | — |
| I-1 | 5.25 | 5.84 | 5.96 | 1000+ |
| I-2 | 4.77 | 7.0+ | 7.0+ | 1000+ |
| I-3 | 7.0+ | 5.61 | 6.22 | — |
| I-4 | 6.16 | 7.0+ | 7.0+ | — |
| I-5 | 5.00 | 7.0+ | 5.11 | — |

+= Test terminated by operator and not run until nozzle failure
—= Ink formula not tested The above results show that the inks employed in the process of the invention provide superior reliability performance (higher amount of ink delivered before failure) in comparison to C-1 which did not contain any aromatic sulfonate, C-2 which contained an ethoxylated surfactant and C-3 which contained another aromatic sulfonate.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive substrates;
   C) loading said printer with an ink jet ink composition comprising from about 30 to about 90% by weight of water, from about 0.5 to about 30% by weight of a pigment, from about 0.05 to about 2% by weight of a compound which is sodium p-toluenesulfonate, disodium 2,5-dihydroxybenzene-disulfonate monohydrate, sodium p-hydroxybenzene-sulfonate or sodium p-aminobenzenedisulfonate, and from about 10 to about 50% by weight of a humectant comprising a polyhydric alcohol; and
   D) printing on an ink-receptive substrate using said ink jet ink in response to said digital data signals.

2. The method of claim 1 wherein said compound is present in said composition in an amount of from about 0.075 to about 0.5% by weight.

3. The method of claim 1 wherein said pigment is C.I. Pigment Yellow 155, C.I. Pigment Blue 15:3, C.I. Pigment Red 122 or C.I. Pigment Black 7.

4. The method of claim 1 wherein said pigment is present at a concentration of from about 1% to about 5% by weight of said ink jet ink composition.

5. The method of claim 1 wherein said polyhydric alcohol is diethylene glycol or a mixture of glycerol and diethylene glycol.

6. The method of claim 5 wherein said polyhydric alcohol is present at a concentration of from about 10 to about 20% by weight of said ink jet ink composition.

* * * * *